United States Patent [19]

Thompson

[11] Patent Number: 4,539,516

[45] Date of Patent: Sep. 3, 1985

[54] SOLAR BATTERY ENERGIZER

[76] Inventor: Marion E. Thompson, c/o Solarts, Inc., 2807 N. Prospect, Colorado Springs, Colo. 80907

[21] Appl. No.: 588,109

[22] Filed: Mar. 9, 1984

[51] Int. Cl.³ .............................................. H02J 7/00
[52] U.S. Cl. .......................................... 320/48; 320/2; 320/3; 320/53; 320/54; 136/291; 136/293; 429/100; 320/61
[58] Field of Search .................... 136/291, 293; 320/2, 320/3, 48, 53, 54, 61; 429/100

[56] References Cited

U.S. PATENT DOCUMENTS

| | | | |
|---|---|---|---|
| 3,344,334 | 9/1967 | Rubin | 320/2 |
| 3,921,049 | 11/1975 | Mellors et al. | 320/2 |
| 4,057,677 | 11/1977 | Mabuchi | 429/100 |
| 4,092,580 | 5/1978 | Prinsze | 320/2 |
| 4,186,335 | 1/1980 | Cahill | 320/3 |
| 4,209,346 | 6/1980 | King | 136/246 |
| 4,264,962 | 4/1981 | Kodaira | 364/707 |
| 4,293,808 | 10/1981 | Varadi et al. | 320/2 |
| 4,311,953 | 1/1982 | Fukuda et al. | 320/2 |
| 4,352,052 | 9/1982 | Opper | 320/2 |

FOREIGN PATENT DOCUMENTS 3105298   9/1982   Fed. Rep. of Germany .......... 320/2

OTHER PUBLICATIONS

Electronic Magazine, Feb. 21, 1974, p. 32, abstract of "Solarex Corporation", article.

Primary Examiner—Aaron Weisstuch
Attorney, Agent, or Firm—Cushman, Darby & Cushman

[57] ABSTRACT

A battery energizer for button batteries, such as zinc-silver oxide or zinc-mercuric oxide batteries, that are normally considered unchargeable, provides for energizing of the batteries in a safe and simple manner. A solar cell having a maximum current output (e.g., 20 milliamps) is operatively connected to terminals for releasably receiving a button battery. A light emitting diode, or like indicator, provides an indication of when the battery is fully energized, and additionally assists in preventing overenergization of the battery. The solar cell, terminals, LED, and the like can be mounted on a nonconductive material mounting plate which is mounted by a suction cup and hook to a window, adjacent a light bulb, or the like. A battery charger for conventional dry cell rechargeable batteries (such as nickel-cadmium batteries) utilizes the solar cells, and LED, and a zener diode connected in parallel with terminals. An adaptor may be provided with the terminal for adapting them for use with any conventional size dry cell battery, and a simple dummy battery may be utilized so that less than the full complement of batteries may be charged utilizing the charger.

17 Claims, 12 Drawing Figures

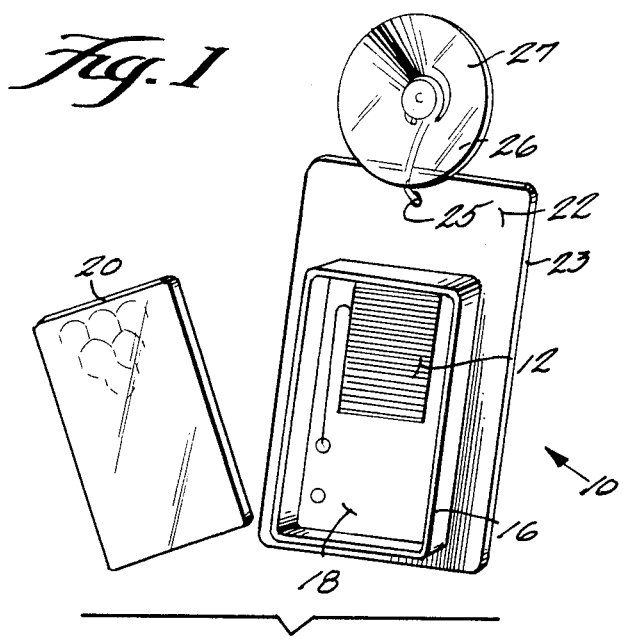
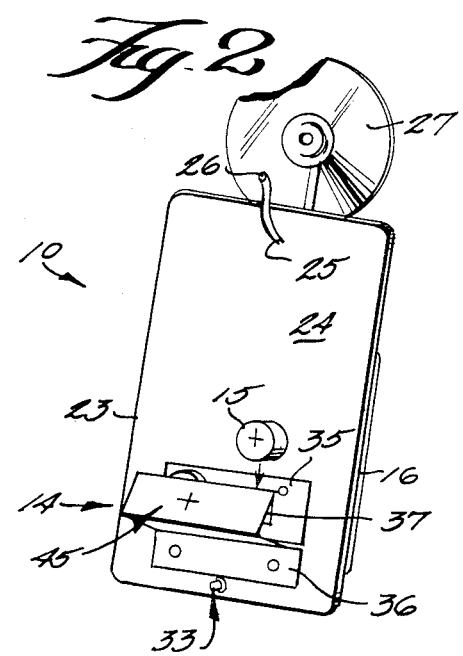
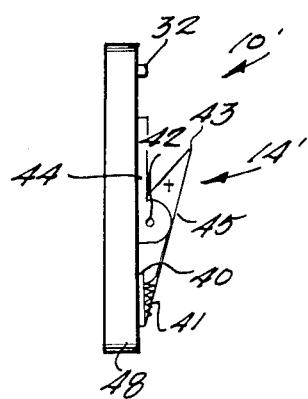
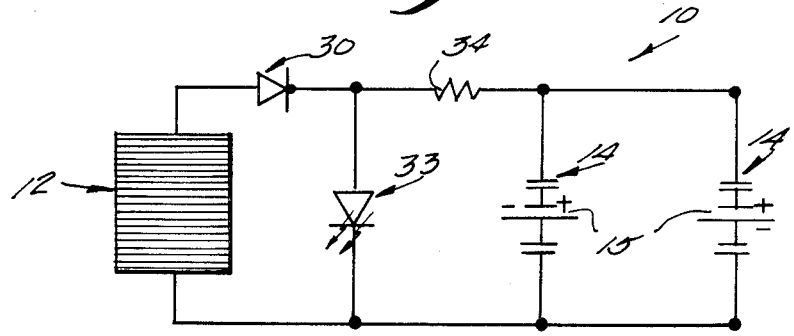
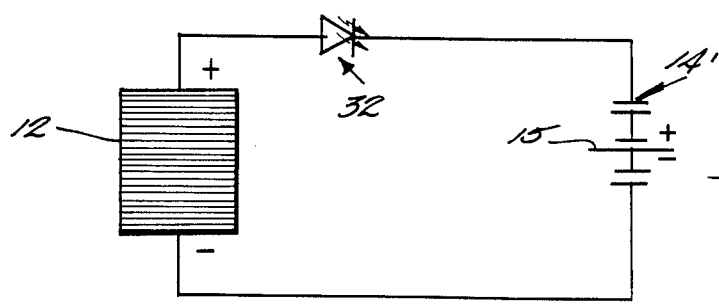

4,539,516

SOLAR BATTERY ENERGIZER

BACKGROUND AND SUMMARY OF THE INVENTION

There are many electrical devices today, such as hearing aids, watches, and the like, that utilize button batteries. A typical button battery is shown in U.S. Pat. No. 3,922,178 (the disclosure of which is hereby incorporated herein by reference. Conventional button batteries usually are zinc-silver oxide, or zinc-mercuric oxide cells. Such button batteries are conventionally considered unrechargeable since there are safety concerns associated with trying to recharge such batteries. If too much electricl energy is supplied to such batteries (too much current or voltage) in an attempt to recharge the same, there is a great danger of explosion. For this reason, such batteries are normally discarded after one use.

It has been found according to the present invention that conventional button batteries can be safely and effectively energized so that they may be effectively used for three or more cycles. Reenergization of such batteries is accomplished according to the invention by limiting the amount of electrical energy supplied thereto in a simple and convenient manner.

According to one aspect of the present invention a battery energizer is provided which comprises: conventional solar cell means for generating a small amount of current when light impacts thereon; and terminal means for releasably receiving a button battery therein, and electrically interconnected to the solar cell means. The solar cell means has a controlled maximum current and voltage output (e.g., 20 milliamperes, 3 volts), and preferably a diode is provided electrically interconnected to the solar cell means and the terminal means. The diode allows passage of current only from the solar cell means to the button battery received by the terminal means, but not vice versa. The diode may comprise a light emitting diode (LED) which provides an indication of when the battery has been fully energized, or is being energized; and the LED may be provided in place of, or connected parallel to, a conventional diode (and thus either in series with, or in parallel with, respectively, the terminal means).

The solar cell means, LED, and terminal means preferably are mounted on a mounting plate. The solar cell means are mounted on one side of the mounting plate, and the LED and terminal means on the opposite side. Means are provided defining an opening in the mounting plate for receipt of a hook, which hook is connected up to a suction cup which may be placed against a window or adjacent an artificial light source to support the solar cell means in an appropriate position to receive light thereon.

Preferably the solar cell means are constructed so that the maximum current output therefrom is about 20 milliamperes, and if it is desirable to limit the amount of light incident on the solar cell, a filter may be provided over the solar cell for that purpose.

According to another aspect of the present invention, solar cell means and terminal means are provided for receipt of a plurality of conventional dry cell rechargeable batteries (such as nickel-cadmium batteries), for charging one or more of the rechargeable batteries at the same time in a simple and effective manner. According to this aspect of the invention, the solar cell means and the terminal means are physically and electrically connected, with an LED indicating the status of the charging batteries, and allowing passage of current from the solar cell means to batteries received by the terminal means, but not vice versa. The charger in this embodiment preferably consists of the solar cell means, LED and terminal means, with a zener diode connected in parallel with the terminal means, and between the terminal means and the LED and solar cell means.

According to the second aspect of the present invention, an adaptor is preferably provided to allow a single size of terminal means (e.g., adapted to receive conventional D-size batteries), to receive a wide variety of other, smaller sized batteries too (e.g., to receive AA-size batteries). Further, in case only one battery—or a number of batteries less than the total number of terminal means—is to be charged at a time, particular dummy batteries may be provided to allow charging.

BRIEF DESCRIPTION OF THE DRAWINGS

FIG. 1 is a front perspective view of an exemplary solar battery energizer according to the present invention;

FIG. 2 is a rear perspective view of the energizer of FIG. 1;

FIG. 3 is a side view showing an alternative embodiment of an energizer according to the present invention;

FIG. 4 is a circuitry schematic illustrating a first exemplary battery energizer according to the present invention;

FIG. 5 is a circuitry schematic like that of FIG. 4 only showing a second embodiment;

DETAILED DESCRIPTION OF THE DRAWING

Figure 6:
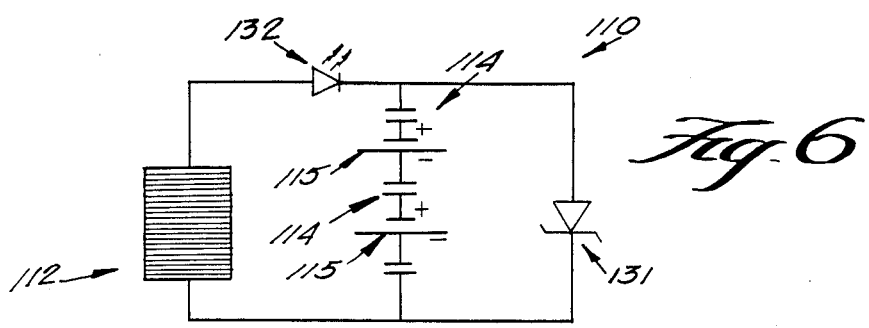
FIG. 6 is a circuitry schematic illustrating charging circuitry utilizable for charging rechargeable batteries (such as Ni-Cad batteries) according to the present invention.
Figure 7:
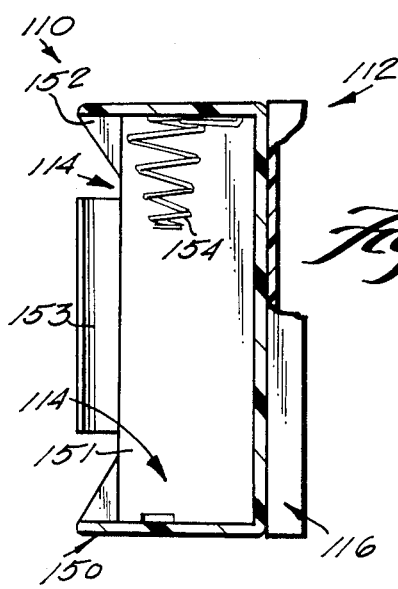
FIG. 7 is a side view, partly in cross-section and partly elevation, of an exemplary structure according to the present invention incorporating the circuitry of FIG. 6.

An exemplary solar battery energizer according to the present invention as shown generally by reference numeral 10 in FIGS. 1, 2, and 4. The major components of the device 10 comprise conventional solar cell means 12 for generating a small current when light impacts thereon, and terminal means 14 for releasably receiving a button battery 15 therein, the terminal means 14 electrically connected to the solar cell means 12.

The term "button battery" as used in the present specification and claims means a button-shaped dry cell battery having zinc-silver oxide electrodes or the like, which battery is normally considered non-rechargeable.

The solar cell means 12 preferably is encapsulated in a housing 16, as more fully described in copending application Ser. No. 203,625 filed Oct. 28, 1980. On top of the housing 16 there preferably is provided a sheet 18 of transparent plastic having a plurality of light concentrating domes formed thereon. The solar cell means 12 preferably comprises an n/p silicon cell, but other types of photovoltaic cells may be utilized. The cell 12 preferably has a maximum current output of about 20 milliamperes, and a maximum voltage output of about 3 volts. If necessary or desirable to limit the electrical energy output of the cell 12, a plastic filter 20 may be provided which fits over the plastic sheet 18, and may be adhesively—or otherwise—secured thereto.

The housing 16 is preferably mounted on a first face 22 of a nonconductive mounting plate 23 (e.g., of fiberboard), while the terminal means 14 is preferably mounted on a second face 24 of the mounting plate 23. In order to provide for proper positioning of the solar cell 12 where it can receive a desired amount of incident light energy, there preferably is provided means defining an opening 25 in the plate 23, which opening 25 receives a hook 26 therein, which hook is operatively connected to a clear plastic suction cup 27. The suction cup 27 may be place on a window, or adjacent an artificial light source.

The battery energizer 10 also preferably comprises a means for allowing passage of current only from the solar cell 12 to button battery 15 (as illustrated in FIG. 4), i.e., not vice versa. Such a means may take the form of a conventional diode 30 which is connected in series with the solar cell 12. Alternatively, as illustrated in FIG. 5, a light emitting diode 32 may be provided in place of the diode 30.

In the FIG. 4 embodiment, a light emitting diode 33 is provided in addition to the regular diode 30, and a small voltage dropping resistor 34 is utilized if necessary. The light emitting diode 33 comprises an electrical energy consuming indicator means, and is connected in parallel with the terminal means 14, and is mounted to the mounting plate 23 so that it is visible from the rear side 24 thereof (see FIG. 2). The LED 33 provides an indicator to indicate when a battery 15 has been sufficiently energized, and also prevents the battery 15 from charging to a higher voltage than approximately 1.6 volts (or its otherwise rated voltage). When the battery 15 reaches that voltage, the current from means 12 is shunted through LED 33.

As illustrated most clearly in FIG. 2, the terminal means 14 may take the form of first and second conductive (e.g., copper) plates 35, 36. The plate 35 is rigidly affixed to the rear face 24 of the mounting plate 23, and is electrically connected to the negative side of the cell 12. The plate 36 preferably comprises a cantilevered spring portion 37 thereof which is parallel to, and spaced from, the first plate 35, and not electrically connected thereto unless a button battery 15 is disposed therebetween. The plate 36 is electrically connected to the diode 30 and to the positive side of the cell 12.

Button batteries 15, such as shown in U.S. Pat. No. 3,922,178, are commonly considered unchargeable because of safety concerns. It is known that if too high an electrical energy input is provided to such a battery in an attempt to energize the same, there is a good probability that the battery will explode.

The embodiment according to the present invention illustrated in FIGS. 3 and 5 is similar to that in the embodiment of FIGS. 1, 2, and 4, except that the light emitting diode 32 is the only diode provided, and that is connected in series with the solar cell 12 and the terminal means 14'. The terminal means 14' is of the type that—when not receiving a button battery 15 therein—is shunted (that is, is closed). The terminal means 14' preferably takes the form of a part of an alligator clip, cooperating with a terminal 40 flat on the casing 48, and having a jaw 41, with a pivotal connection 42 between jaw 41 and a member 44 affixed to base 48, and with a lever 43 for effecting pivotal movement of the jaw 41 with respect to the terminal 40 for insertion of button battery 15 therebetween. Also, the casing 16 and plate 23 are provided as an integral nonconductive casing 48 containing the solar cell means 12 and other components.

For both the terminal means 14 and 14' indicia such as shown by 45 in FIG. 2 are preferably provided indicating which part of the terminal is to be connected up to the positive side of the solar cell (see indicia 45 in FIGS. 2 and 3).

The embodiment of the invention illustrated in FIGS. 6 through 12 of the drawings is adapted for charging conventional dry cell rechargeable batteries, such as conventional nickel-cadmium batteries. In this embodiment, structures having functions generally corresponding to those of the FIGS. 1 through 5 embodiments are illustrated by the same reference numeral only preceded by a "1".

The solar cell means 112 is connected to light emitting diode 132, with terminal means 114 for receipt of the rechargeable batteries 115 and parallel with a zener diode 131. The solar cell means 112 preferably are mounted in a casing 116, which in turn is integral with, or otherwise physically connected to, a rear plastic housing 150 which includes the terminal means 114, and plastic clips for holding eventual rechargeable batteries in place. For instance, the means 150 comprises a center plastic wall 151, and plastic side walls 152, each having a flexible plastic arm 153 associated therewith which may be cammed out of the way when a battery is inserted into the area defined by the walls 151, 152, and holds the battery in place. The terminal means, for each compartment (i.e., volume defined by the walls 151, 152) preferably comprises a coil spring 154, and a flat conductive terminal 155. Any number of chambers defined by walls 151, 152 may be provided, and electrically interconnected to each other. Preferably the chambers are designed to receive conventional D-size dry cell batteries.

Figure 9:
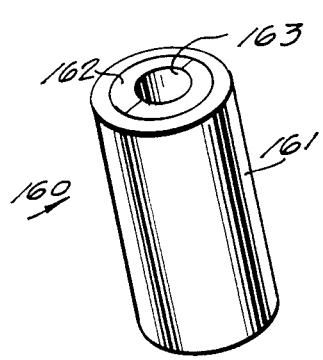
FIG. 9 is perspective view of an exemplary adaptor for use with the structure of FIGS. 7 and 8.
Figure 10:
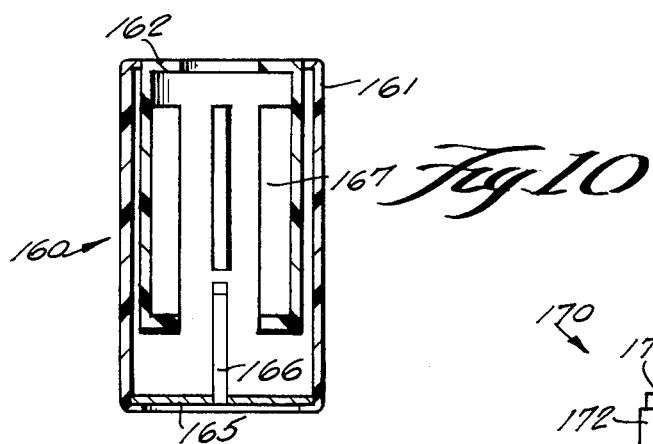
FIG. 10 is a longitudinal cross-sectional view of the adaptor of FIG. 9.

In order to allow the structure 110 to be readily utilized with conventional size dry cell batteries smaller than a D-size cell (e.g., C, AA, etc.), adaptors, such as the adaptor 160 illustrated in FIGS. 9 and 10 may be utilized. The adaptor 160 comprises an outer cylindrical casing 161 of nonconductive material, and having a top insert 162 of nonconductive material which has an opening 163 formed therein for a male terminal of a conventional dry cell battery to project through. For the particular adaptor 160 illustrated in FIGS. 9 and 10, an AA-size battery is adapted to be received thereby.

The bottom of the adaptor 160 comprises a nonconductive false bottom 164, and a bottom wall 165 of conductive material (e.g., copper). The wall 165 preferably has a spring finger 166 cut out therefrom, and cantilevered thereto, the spring finger 166 extending into the volume defined by the casing 161 - as illustrated in FIG. 10. Internal ribs 167 may be provided attached to the cylindrical casing 161 for positively positioning a battery (such as an AA size) within the casing 161.

Figure 11:
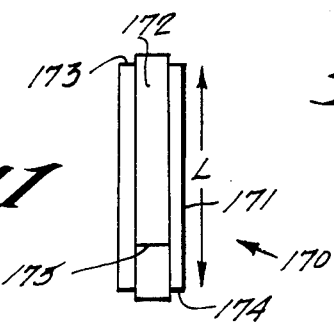
FIG. 11 is a side view of an exemplary dummy battery utilizable with the structure of FIGS. 7 and 8.
Figure 12:
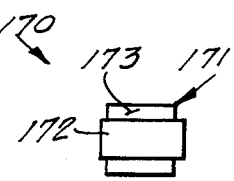
FIG. 12 is a top view of the dummy battery of FIG. 11.

In order to allow the charger 110 to be utilized for charging a number of batteries less than the number of terminal means 114 thereof, one or more dummy batteries may be utilized, such as the dummy battery 170 illustrated in FIGS. 11 and 12. This dummy battery 170 comprises a rod 171 of nonconductive material, such as plastic or wood. The rod 171 has a length L substantially the same as the length of a conventional dry cell battery (e.g., a size D battery). The rod 171 preferably is polygonal in cross-section, such as the rectangular cross-section of rod 171 illustrated in FIG. 12.

Affixed to the rod 171 is a strip of conductive material, such as a self-adhesive copper tape strip 172, which extends along two opposite sides of, and the ends 173, 174 of the rod 171. The strip 172 is a continuous strip, overlapped at the ends thereof as illustrated by reference numeral 175 in FIG. 11. The dummy battery 170 may be inserted in association with any one of the terminal means 114.

OPERATION

The operation of the FIGS. 1, 2, and 4 embodiment will now be described:

One, or more, button batteries 15 are pushed between the stationary terminal plate 35 and the spring portion 37 of terminal plate 36, with the positive side of the button battery 15 engaging the spring portion 37 (which is marked "+", i.e., "positive", by indicia 45). When there is no battery 15 received by the terminal means 14, or when the battery 15 inserted therebetween is dead, the LED 33 will light up. However, when an energizable, but depleted, button battery 15 is inserted into operative association with the terminal means 14, the LED goes off.

With a button battery 15 in place in the terminal means 14, and the LED 33 off, the suction cup 27 is pressed against any appropriate surface so that light will be incident on the solar cell 12. After a predetermined time period in this position (e.g., 4-6 hours), the battery 15 will be fully energized. Once it reaches its full energization voltage (e.g., about 1.6 volts), the current from the cell 12 passes through the LED 33, in series with the terminal means 14, and the LED 33 again lights, indicating that the battery 15 is energized. The battery 15 is then removed from the terminal means 14, and re-used. This procedure may be repeated at least three times.

For the FIGS. 3 and 5 embodiment, the LED 32 is "on" (emits light) without a battery 15 received by the terminal means 14' as long as light is incident upon cell 12, since the jaws 40, 41 are in contact with each other. By pressing on lever 43, the jaw 41 is moved away from the jaw 40 temporarily breaking the circuit, and then the button battery 15 is inserted between the jaws 40, 41, with the positive face of the button battery in engagement with the jaw 41 (marked "+", or "positive", by indicia 45). With the energizable, but depleted, battery 15 received by the terminal means 14', the LED 32 is bright. Then the plate 23 is mounted—in the manner described for the first embodiment—so that light strikes the cell 12, and energization continues until the battery 15 is complete energized, at which point the LED 32 is completely off.

In the operation of the embodiment of FIGS. 6 through 12, for charging one AA-size battery, the AA battery is slipped through the opening 163 in the top 162 of housing 161, with the male terminal portion extending outwardly through the opening 162 and with the bottom thereof engaging false bottom 164, and pressing against the spring contact 166. The adaptor 160 is then pushed into one of the compartments defined by walls 151, 152, such as the left-hand compartment illustrated in FIG. 8, with the bottom 165 of the adaptor 160 engaging the spring 154, and the male terminal of the AA battery within the casing 161 engaging the terminal 155, and with the resilient plastic arm 153 holding adaptor 160 in place.

Figure 8:
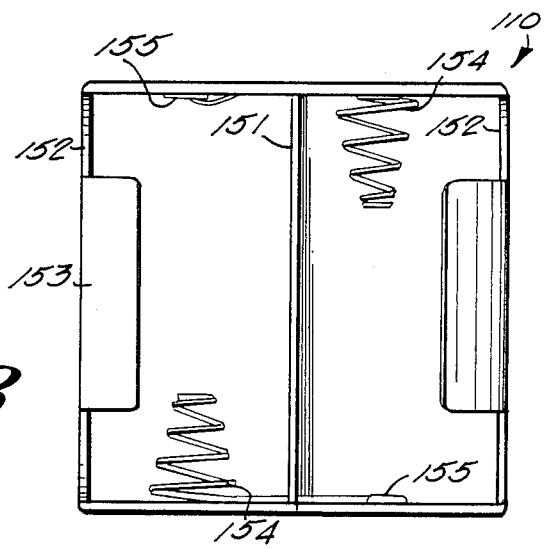
FIG. 8 is a back view of the structure of FIG. 7.

The nonconductive rod 171 of the dummy battery 170 is grasped, and the dummy 170 is inserted into the right-hand compartment of the charger 110 illustrated in FIG. 8, with portions of the conductive tape 172 covering the top and bottom ends 173, 174 of the rod 171, respectively, engaging the spring 154 and terminal 155.

Light incident upon solar cell means 112 passes through light emitting diode 132 and effects charging of the battery received by the terminal means 114. Overcharging will not occur due to the fact that the zener diode 131 is provided, and since the solar cell means 112 is of relatively small rating (e.g., for this embodiment 7 volts, 50 milliamps).

It will thus be seen that according to the present invention a simple yet effective battery energizer has been provided for energizing button batteries which have heretofore been considered "unchargeable", and thus disposed of without re-use. Also, a simple and effective charger for conventional rechargeable dry cell batteries is provided according to the invention.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A battery energizer comprising:
    solar cell means for generating a small current when light impacts thereon;
    terminal means for releasably receiving a button battery therein and, comprising: a first conductive plate physically mounted so that it is stationary with respect to said solar cell means; and a generally L-shaped second conductive plate, including a cantilevered spring portion, said second plate mounted so that said cantilevered spring portion is generally parallel to, and spaced from, said first terminal plate; said first and second terminal plates being electrically connected only when a button battery is disposed between said cantilevered spring portion of said second plate and said first plate; and
    means for allowing passage of current from said solar cell means to a button battery received by said terminal means, but not vice versa.

2. A battery energizer as recited in claim 1 wherein said current passage allowing means comprises a light emitting diode.

3. A battery energizer as recited in claim 2 wherein said terminal means is in series with said light emitting diode and solar cells means, and wherein said terminal means is in a shorted condition when not receiving a button battery therein.

4. A battery energizer as recited in claim 2 wherein said solar cell means has a maximum voltage of about three volts, and wherein said light emitting diode is rated such that when a button battery received by said terminal means is fully energized said light emitting diode will be off, otherwise said light emitting diode will be on as long as sufficient light energy impacts upon said solar cell means.

5. A battery energizer as recited in claim 1 in combination with at least one button battery received by said terminal means, said button battery comprising a battery normally considered unrechargeable because of safety considerations if too much electrical energy is applied to said battery.

6. A battery energizer as recited in claim 1 wherein said solar cell means is mounted on a first face of a nonconductive material mounting plate, and wherein said terminal means is mounted on a second face of said mounting plate, opposite said first face.

7. A battery energizer as recited in claim 6 further comprising means defining an opening in said mounting plate for receipt of a hook; a hook; and a suction cup connected to said hook, so that said suction cup may support said mounting plate, and the components mounted thereon, via said hook.

8. A battery energizer as recited in claim 6 further comprising a light emitting diode operatively mounted on said second face of said mounting plate.

9. In combination with a battery normally considered unrechargeable due to safety concerns if too high a voltage or current is applied to said battery, a battery energizer comprising:
means for supplying a safe level of electrical energy to said battery to energize said battery, said electrical energy supplying means comprising: solar cell means for generating a small current when light impacts thereon; and a diode; and
terminal means for releasably receiving said battery therein, said terminal means operatively electrically connected to said solar cell means and said diode, said terminal means comprising: a first conductive plate physically mounted so that it is stationary with respect to said solar cell means; and a generally L-shaped second conductive plate, including a cantilevered spring portion, said second plate mounted so that said cantilevered spring portion is generally parallel to, and spaced from, said first terminal plate; said first and second terminal plates being electrically connected only when a battery is disposed between said cantilevered spring portion of said second plate and said first plate.

10. A combination as recited in claim 9 wherein said diode comprises a light emitting diode connected in parallel with said terminal means.

11. A combination as recited in claim 9 wherein said diode comprises a light emitting diode connected in series with said terminal means and said solar cell means.

12. A battery energizer as recited in claim 9 wherein said solar cell means is mounted on a first face of a nonconductive material mounting plate, and wherein said terminal means is mounted on a second face of said mounting plate, opposite said first face.

13. A battery energizer as recited in claim 12 further comprising means defining an opening in said mounting plate for receipt of a hook; a hook; and a suction cup connected to said hook, so that said suction cup may support said mounting plate, and the components mounted thereon, via said hook.

14. A battery energizer as recited in claim 12 further comprising a light emitting diode operatively mounted on said second face of said mounting plate.

15. A battery energizer comprising:
solar cell means for generating a small current when light impacts thereon;
terminal means for releasably receiving a button battery therein, said terminal means electrically connected to said solar cell means;
light emitting indicating means having a first condition indicating when a button battery received by said terminal means is fully energized, and having a second condition, different from said first condition, indicating that a button battery—when first placed in operative association with said terminal means—can be energized;
a nonconductive material mounting plate, said solar cell means mounted on a first face of said mounting plate, and said terminal means mounted on a second face of said mounting plate; and
means defining an opening in said mounting plate for receipt of a hook; a hook; and a suction cup connected to said hook so that said suction cup may support said mounting plate, and the components mounted thereon, via said hook.

16. A battery energizer as recited in claim 15 wherein said terminal means comprises a first conductive plate physically mounted to said second face of said mounting plate, and a second conductive plate physically mounted to said second face of said mounting plate.

17. A battery energizer as recited in claim 16 wherein said second conductive plate has a generally L-shaped configuration, including a cantilevered spring portion, and wherein said second plate is mounted with respect to said first plate so that said cantilevered spring portion is generally Parallel to, and spaced from, said first plate.

* * * * *